Dec. 24, 1940.  M. E. LANGE ET AL  2,225,913
MACHINE TOOL
Filed April 28, 1939  6 Sheets-Sheet 1

INVENTORS
MAX E. LANGE
BY JOHN J. N. VAN HAMERSVELD
Kwis Hudson & Kent
ATTORNEYS

Patented Dec. 24, 1940

2,225,913

UNITED STATES PATENT OFFICE 2,225,913

MACHINE TOOL

Max E. Lange and John J. N. Van Hamersveld, Cleveland Heights, Ohio, assignors to The Warner & Swasey Company, Cleveland, Ohio, a corporation of Ohio Application April 28, 1939, Serial No. 270,620

33 Claims. (Cl. 82—29)

This invention relates to a machine tool and more particularly to a unit for selecting or preselecting the speeds or feeds of a movable part of a machine tool.

An object of the invention is to provide an improved selecting or preselecting unit for a change speed transmission in a machine tool and which unit is of such character that it may be located in any convenient location on the machine or remotely detached from the machine.

Another object is to provide in a machine tool in operative association with a change speed transmission thereof, power means for effecting speed changes in the transmission, together with an improved and novel selecting or preselecting unit for controlling the actuation of said power means.

Another object is to provide in a machine tool having a change speed transmission and a main driving connection thereto, power means for effecting speed changes in said transmission and for effecting the connection and disconnection of the main driving connection, together with an indexible unit to select or preselect the various speeds, and a single control member for controlling said main driving connection and for actuating said unit to obtain the selected or preselected speeds.

A further object is to provide in a machine tool having a change speed transmission, power means for effecting speed changes in said transmission and a control unit for said power means operatively associated therewith for selecting or preselecting various speeds and for initiating operation of said power means to effect changes in said transmission to the selected or preselected speeds.

Another object is to provide in a machine tool having a transmission provided with shiftable change speed members, power means for shifting said members, control elements for said power means and a control unit for said elements indexible to select or preselect various rates of speeds and then actuatable to operate one or more of said control elements to effect actuation of one or more of said power means to cause a shifting of one or more of said shiftable members in said transmission to obtain the selected or preselected speed.

A still further and more specific object is to provide a novel and effective way to select or preselect and to obtain speed changes for a movable part of a machine tool wherein cylinders and pistons or solenoids are employed to shift the shiftable members of a change speed transmission, and the operation of said cylinders and pistons or solenoids is controlled by control valves or switches which are operatively associated with a control unit indexible to various positions representative of various speeds and then actuatable while in such indexed position to cause shifting of one or more of said control valves or switches to effect operation of one or more of said cylinders and pistons or solenoids and shifting of one or more of the shiftable members of the transmission to obtain the selected or preselected speed.

Further and additional objects and advantages will become apparent hereinafter during the detailed description which is to follow of two embodiments of the invention. Referring to the acompanying drawings wherein said embodiments of the invention are illustrated:

It will be understood that in illustrating embodiments of the invention as applied to a turret lathe that such application is intended merely by way of example and is not to be construed as restrictive in any sense since the invention may be applied to various other types of machine tools wherein change speed transmissions are applied for varying the speed of a movable part thereof. It will also be understood that mechanism embodying the invention can be applied to transmissions of a machine tool other than the transmission in the headstock, as for example, to the change speed transmissions in the aprons of the turret slide and the cross slide carriage.

Figures 1, 10:
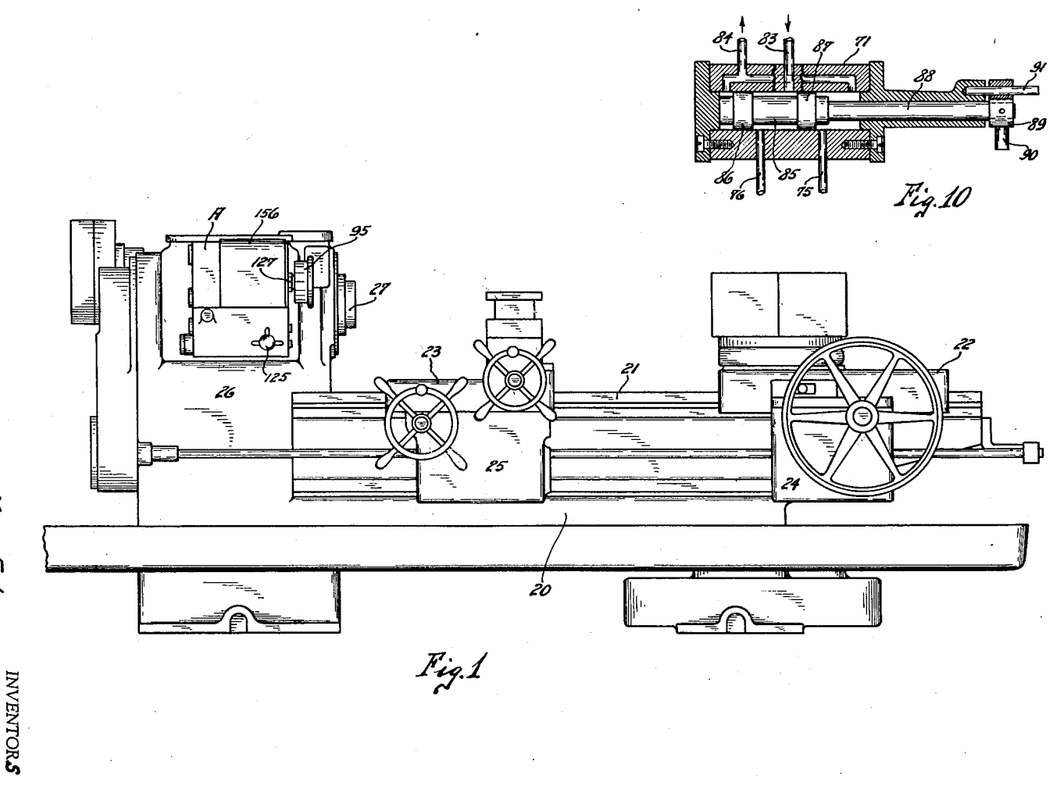
Fig. 1 is a front elevational view of a turret lathe having the unit forming the subject matter of the invention applied to the front of the headstock thereof.
Fig. 10 is a detached sectional view on a larger scale of one of the control valves shown in Fig. 6 for controlling the power means that shift the shiftable members of the change speed transmission.

The turret lathe shown in Fig. 1 comprises the usual bed 20 provided with ways 21 on which travel the turret slide 22 and the cross slide carriage 23, said slide and carriage having the usual depending aprons 24 and 25, respectively, which house the change speed gearing in the feed drives to the turret slide, cross slide carriage and cross slide. At one end of the ways 21 is the headstock 26 in which is rotatably mounted the work spindle 27 and the change speed transmission for the spindle as well as the main driving clutch, all as will be well understood in the art.

The selecting or preselecting mechanism embodying the present invention is in the form of a unit which, in this instance, is secured to the front side of the head stock within convenient reach of the operator and is indicated in the drawing as an entirety by the letter A and will be later referred to herein in detail.

It might be well to point out at this time that although the selecting or preselecting mechanism unit A is shown mounted on the front side of the headstock that it could equally as well be mounted on any other convenient part of the machine tool or could be remotely mounted in a position detached from the machine tool and one readily accessible to the operator. Also, as already mentioned, the unit could be employed in operative association with the change speed transmissions in the aprons as distinguished from the change speed transmission in the headstock.

Figure 6:
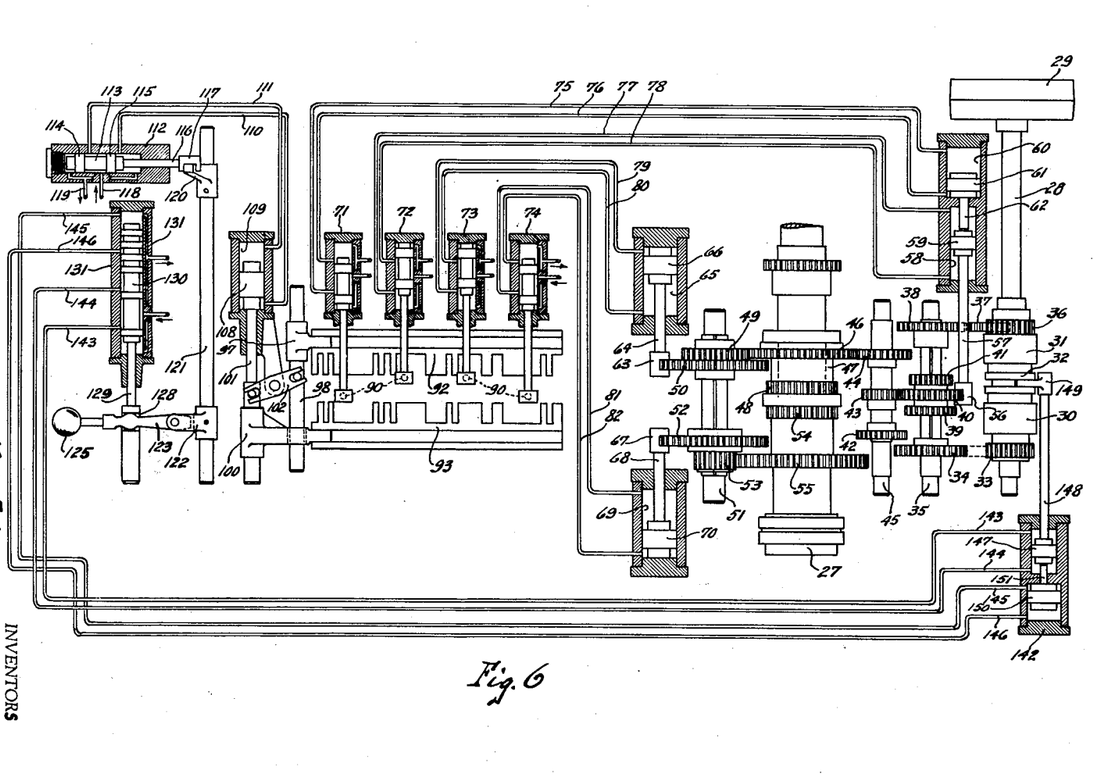
Fig. 6 is a developed plan and sectional diagrammatic view of the change speed transmission in the head stock, the fluid pressure power means for shifting the shiftable elements of said transmission and the main driving clutch, the unit of the invention comprising the control valves for said power means and the selecting or preselecting mechanism for controlling certain of said control valves as well as the control mechanism for the control valve associated with the power means for shifting the main driving clutch.

Referring to Fig. 6, the change speed transmission in the headstock will now be described in detail. The shaft 28 is the main driving shaft and in this instance is shown provided on its end and exteriorly of the headstock with a main driving pulley 29 receiving a driving belt not shown. It will be understood that in place of the pulley 29, an electric motor or other power source could be applied to the shaft 28.

The main driving shaft 28 is continuously rotated during the operation of the machine and is provided with a main driving clutch consisting of the non-shiftable clutch elements 30 and 31 which are freely rotatable on the shaft 28 and the shiftable clutch element 32 which is splined on the shaft 28 to rotate therewith and be moved endwise thereof to clutching engagement with one or the other of the elements 30 and 31 or into a disengaged or neutral position.

The clutch element 30 is provided with a gear 33 that rotates therewith and is constantly in mesh with a gear 34 fixed to a shaft 35 rotatable in the headstock. When the shiftable clutch element 32 is clutched to the element 30 the shaft 35 is rotated in a direction to provide forward rotation to the work spindle 27.

The clutch element 31 is provided with a gear 36 similar to the gear 33 of the clutch element 30 and said gear 36 meshes with an idler gear 37 which, in turn, constantly meshes with a gear 38 also fixed to the shaft 35. It will be seen that when the shiftable clutch element 32 is clutched to the element 31 that rotation will be imparted to the shaft 35 through the gears 36, 37 and 38 in a direction to impart reverse rotation to the work spindle 27.

A three-step gear cone consisting of the gears 39, 40 and 41 is splined on the shaft 35 for rotation therewith and endwise shifting movement thereon and said gears 39, 40 and 41 of the three-step gear cone are adapted to be intermeshed with gears 42, 43 and 44, respectively, fixed on a shaft 45 rotatably mounted in the headstock, wherefore it will be seen, that rotation can be imparted to the shaft 45 from the shaft 35 at any one of three different speeds depending upon the position of the three-step gear cone on the shaft 35 and in opposite directions depending upon which clutch element 30 or 31 is engaged by the shiftable clutch element 32.

The gear 44 on the shaft 45 constantly meshes with a gear 46 that is fixed to a sleeve 47 which in turn is freely rotatable on the work spindle 27. The sleeve 47 also has fixed thereto a gear 48. A two-step gear cone formed of the gears 49 and 50 is splined on a shaft 51 for rotation therewith and endwise movement thereon and can be shifted to bring the gear 49 into mesh with the gear 46 or the gear 50 into mesh with the gear 48, wherefore the shaft 51 can be rotated in any one of six different speeds from the shaft 28 and in opposite directions.

A second or front two-step gear cone formed of the gears 52 and 53 is also splined on the shaft 51 and can be shifted endwise thereof to bring the gear 52 into mesh with a gear 54 fixed to the spindle 27 or the gear 53 into mesh with a gear 55 also fixed to the spindle, wherefore said spindle can be rotated in opposite directions at any one of twelve different speeds. The transmission just described is conventional and well understood in the art.

In carrying out the present invention it is contemplated that the shiftable gear cones in the transmission be shifted by power operated means and as illustrative of one form of power operated means which can be employed for this purpose the pressure fluid cylinders and pistons now to be described are used.

The three-step gear cone on the shaft 35 is shifted to any one of its three different operative positions by means of a shoe 56 that straddles the gear 40 and is fixed to one end of a shifting rod 57, the opposite end of which rod extends into a cylinder 58 and is provided with a piston 59 slidably fitting said cylinder.

Pressure fluid can be admitted to or exhausted from the cylinder 58 at opposite sides of the piston 59. Adjacent to the cylinder 58 and in longitudinal extension thereof is a cylinder 60 of greater cross-sectional area than the cylinder 58 and in which slides a piston 61 provided with an abutting pin 62 that extends into the cylinder 58 through an opening in the partition between the cylinder 58 and 60 and against which the piston 59 will abut when the three-step gear cone is positioned with the gear 40 in mesh with the gear 43, as will later become more apparent. The operation of the pressure fluid power means for shifting the three-step gear cone will be explained in greater detail hereinafter.

The rear two-step gear cone on the shaft 51 is shifted by pressure fluid power means which comprises a shoe 63 fixed on one end of a shifting rod 64, the opposite end of which rod extends into a cylinder 65 and has mounted thereon a piston 66 that slidably fits said cylinder.

The front two-step gear cone on the shaft 51 is shifted by similar pressure fluid power means that includes the shoe 67 fixed on one end of a shifting rod 68 and straddling the gear 52 with the opposite end of said shifting rod extending into a cylinder 69 and being provided with a piston 70 slidably fitting said cylinder.

The three pressure fluid power means for shifting the shiftable gear cones of the transmission are controlled by four similar valves 71, 72, 73 and 74. The valves 71 and 72 are operatively associated with the pressure fluid power means for shifting the three-step gear cone on the shaft 35 while the valves 73 and 74 are operatively associated with the pressure fluid power means for shifting the rear and front two-step gear cones, respectively, on the shaft 51.

The control valves 71, 72, 73 and 74 constitute part of the selecting or preselecting mechanism unit embodying the invention and are located in the housing of the unit indicated generally in Fig. 1 by the letter A.

The control chamber of the control valve 71 is connected to opposite ends of the cylinder 60 by conduits 75 and 76 while the chamber of the control valve 72 is connected to opposite ends of the cylinder 58 by the conduits 77 and 78. The chamber of the control valve 73 is connected to opposite ends of the cylinder 65 by conduits 79 and 80 while the chamber of the control valve 74 is connected to opposite ends of the cylinder 69 by the conduits 81 and 82.

In Fig. 10 there is illustrated in section and on a larger scale, a control valve corresponding in construction to the control valves 71, 72, 73 and 74 and which, for purposes of this description, will be indicated as the control valve 71, it being understood that the construction of the control valve 71 is identical with the constructions of the other control valves.

The control valve 71 is provided with an inlet conduit 83 connected to a suitable source of pressure fluid and communicating with the valve chamber intermediate the ends thereof. The control valve 71 is provided with an outlet or exhaust conduit 84 that communicates with the opposite ends of the valve chamber by a passage formed in the valve housing. The valve body 85 is provided with longitudinally spaced lands 86 and 87 which are always located on opposite sides of the inlet conduit 83 and due to the reduced extended ends of the valve body 85 never are brought completely to the ends of the valve chamber wherefore the exhaust openings are, at all times, in communication with the chamber.

It will be seen that when the valve body 85 is in the position shown in Fig. 10 the pressure fluid entering through the inlet conduit 83 passes through the valve chamber between the lands 86 and 87 and outwardly of said chamber through the conduit 76. It will also be understood that exhaust fluid entering the valve body through the conduit 75 will be exhausted therefrom through the exhaust conduit 84.

When the valve body 85 is at its opposite extremity of movement in the chamber from the position of Fig. 10, the flow of pressure fluid therethrough will be reversed and the incoming pressure fluid will then flow between the lands 86 and 87 and outwardly through the conduit 75 while exhaust fluid entering the valve chamber from the conduit 76 will be exhausted through the outlet or exhaust conduit 84.

The valve body 85 is provided with an operating stem 88 that projects outwardly from the valve chamber through a bearing extension on the valve housing and is provided on its outer end with a head 89 fixed to the stem 88 and having a projecting pin 90.

Figures 2, 3:
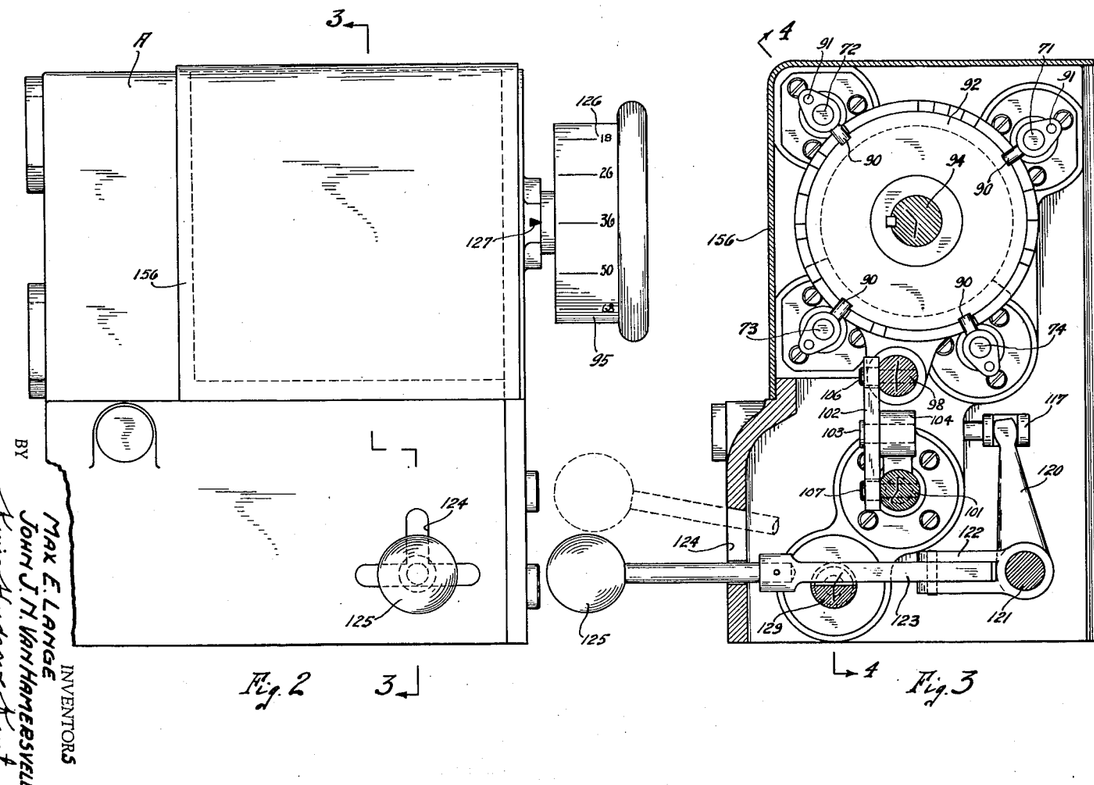
Fig. 2 is a fragmentary front elevation on a larger scale of the unit applied to the headstock of the turret lathe shown in Fig. 1.
Fig. 3 is a transverse vertical sectional view through the selecting or preselecting unit embodying the present invention and is taken substantially on irregular line 3—3 of Fig. 2, looking in the direction of the arrows.

The control valves 71, 72, 73 and 74 are arranged in the unit A, as indicated in Fig. 3, it being noted that said control valves are unequally spaced circularly for a reason later to be explained and that the pins 90 of the heads 89 on the operating stems 88 propect inwardly in a radial direction.

It will also be noted by reference to Figs. 3 and 10 that the bearing extensions of the valve housings are provided with outwardly projecting guiding rods 91 that extend through openings in the heads 89, wherefore said heads are free to move with the valves and operating stems but are held by the rods against rotation so that the pins 90 will always project radially inwardly.

The pins 90 extend between the adjacent faces of a pair of spools 92 and 93 that are splined upon a shaft 94 rotatably mounted in the housing of the unit, wherefore said spools will rotate with said shaft but can be moved endwise thereof toward and away from each other by a mechanism later to be explained. The shaft 94 projects outwardly of the housing of the unit and has fixed to its projecting end an indexing dial 95.

The adjacent faces of the spools 92 and 93 are provided with four sets of equally spaced long and short projections and short and long projections there being twelve such projections in each set corresponding to the twelve different spindle speeds.

The projections of each set on the spool 92 cooperate with the projections of the corresponding set on the spool 93 and it will be noted that the four pins 90 carried by the heads 89 fixed to the stems 88 of the control valves are located between the cooperating projections of the corresponding sets of projections on the adjacent faces of the two spools and so spaced circumferentially as to be in the proper relative positions for engagement by the projections of the respective sets of projections when the spools are moved toward each other to their most inward position.

The spools 92 and 93 are moved endwise toward and away from each other with an equalized movement on the shaft 94 by means of mechanism including a yoke 96 formed integral with a sleeve 97 that is fixed to a sliding rod 98 mounted in the housing of the unit A, it being noted that said yoke 96 extends into a circular groove in the spool 92. A yoke 99 extends into a circular groove in the spool 93 and has an integral sleeve portion 100 which is arranged on and secured to a sliding rod 101 also mounted in the housing of the unit and forming an extension of the piston rod of a pressure fluid rod later to be referred to. The sleeve portion 100 is connected to the yoke 99 by an elongated arm which is provided with an opening through which the rod 98 freely extends as clearly shown in Fig. 4. An equalizer bar 102 is rockably mounted on a bearing pin 103 intermediate the ends of the equalizer bar and carried by a bracket arm 104 formed integral with the cap 105 of the pressure fluid motor just referred to. The opposite ends of the equalizer bar 102 are fork-shaped and straddle pins 106 and 107 carried, respectively by the sliding rods 98 and 101, wherefore it will be seen that movement of one of the rods will impart an equalized movement in the opposite direction to the other rod and such movement of the rods will in turn through the yokes 96 and 99 impart equalized linear movements to the spools 92 and 93 in opposite directions toward and away from each other.

As already stated the rod 101 is an extension of a piston rod of a pressure fluid motor and said motor comprises the piston 108 and cylinder 109. The opposite ends of the cylinder 109 (see Fig. 6) are connected by means of conduits 110 and 111 with the valve chamber of a control valve 112 that is formed in the housing of the unit A.

The valve body 113 of the control valve 112 is provided with spaced lands 114 and 115 inwardly of the ends of the body as clearly shown in Fig. 6. The valve body 113 has an outwardly extending operating stem 116 provided on its end with a head 117 that has a slot into which projects a lever arm, later to be referred to. The valve chamber of the control valve 112 is in communication with a source of pressure fluid by means of a conduit 118 that extends to the chamber midway of the ends thereof. The opposite ends of the valve chamber of the valve 112 are in communication with an exhaust conduit 119 as clearly shown in Fig. 6.

It will be understood that movement of the valve body 113 from one extreme position to its opposite extreme position in the valve chamber will cause pressure fluid to be applied on one side or the other of the piston 108 and exhausted from the opposite side thereof, wherefore the rod 101 can be moved in opposite directions depending upon the setting of the control valve 112, with the result that said control valve 112 controls the equalized inward and outward linear movements of the spools toward and away from each other.

The valve 112 is controlled by a lever arm 120 having a portion cooperating with the slot in the head 117 of the operating stem 116 of the valve and provided with a sleeve fixed to a rod 121 rockably mounted in the housing of the unit. The rod 121 is rocked by means of a forked arm 122 provided with a sleeve fixed to the rod.

A control lever 123 has its inner end extending into the forked lever 122 and pivotally connected thereto and said lever extends outwardly of the front wall of the housing of the unit through an inverted T-slot 124, as clearly shown in Figs. 2 and 3.

It will be seen that when the control lever 123 is raised and lowered in the vertical portion of the inverted T-slot 124 by means of the hand knob 125 on the outer end of the lever, the rod 121 will be rocked and cause a shifting movement of the valve body 113 in the control valve 112, it being noted that when the control lever 123 is in its lowermost position the valve body is located in the chamber of the valve 112, as shown in Fig. 6, at which time the spools will have been moved to their most outward position wherein they may be indexed to any desired position by rotating the indexing dial 95 which is provided with graduations and indicia 126, representative of various spindle speeds and with a fixed pointer 127 arranged on the housing of the unit.

When the control lever 123 is moved to its most upward position, as shown in dash lines in Fig. 2, the valve body 113 of the control valve 112 is shifted to its opposite extreme position from that shown in Fig. 6, wherefore the piston 108 of the pressure fluid motor is moved to its opposite extreme position from that shown in Fig. 6, with a resulting equalized inward movement of the spools 92 and 93 toward each other to bring the cooperating projections on the adjacent faces thereof into operative relation with the pins 90 to effect a shifting of the pins, and, in turn, the shifting movement of the valve bodies of the control valves 71, 72, 73 and 74 with a resultant operation of the pressure fluid motors that are operatively associated with the shiftable gear cones in the transmission, all of which will be more fully referred to hereinafter during a summarizing description of the mode of operation.

As previously stated the control lever 123 is pivotally connected to the forked lever 122, and it will be noted that said control lever 123 is provided intermediate its ends with a rounded portion located in a slot 128 formed in an enlarged portion of a valve operating stem 129. The valve operating stem 129 is connected to the valve body 130 of a control valve 131 arranged in the housing of the unit A. It will be seen that movement of the control lever 123 about its pivot and in the horizontal portion of the inverted T-slot 124 will effect a shifting movement of the valve body 130 without causing any rocking movement to the shaft 121 or a resultant shifting movement of the valve body 113, which occurs only when the control lever is raised or lowered vertically at which times it will be out of the slot 128. Therefore, only one or the other of the valves 112 and 131 can be operated at a time.

The control valve 131 is a three-position valve and will be described in detail by reference to Figs. 7, 8 and 9. The chamber of the control valve 131 is in communication with a source of pressure fluid by means of a conduit 132, while the opposite ends of the chamber of the control valve 131 are exhausted by means of an exhaust conduit 133. The valve body 130 is provided with a plurality of lands 134, 135, 136, 137, 138 and 139. The valve chamber of the control valve 131 is connected with the opposite ends of cylinders 140 and 141 of a pressure fluid motor indicated at 142. The conduits 143 and 144 connect the opposite ends of the cylinder 140 with the valve chamber of the control valve 131, while the conduits 145 and 146 connect the opposite ends of the cylinder 141 with said valve chamber.

The pressure fluid motor 142 constitutes a power means for moving the shiftable element 32 of the main driving clutch into either its neutral or disengaged position, or into its two engaged positions for forward or reverse drive.

The pressure fluid motor 142 is carried by the head stock adjacent to the main driving clutch, and it will be noted that the diameter of the cylinder 141 is larger than the diameter of the cylinder 140. A piston 147 is slidably mounted in the cylinder 140 and has a piston rod 148 extending outwardly of the cylinder and provided at its outer end with a yoke 149 that straddles a circular groove in the shiftable clutch element 32, wherefore it will be seen that movement of the piston 147 in the cylinder 140 will effect a shifting movement of the clutch element 32. When the piston 147 is in its two extreme positions of movement in the cylinder 140, as indicated in Figs. 8 and 9, the shiftable clutch element 32 will be in clutch engaging position for reverse and forward drives respectively. When the piston 147 is in its intermediate position in the cylinder 140, as indicated in Fig. 7, the clutch element 32 will be in disengaged or neutral position.

Figure 7:
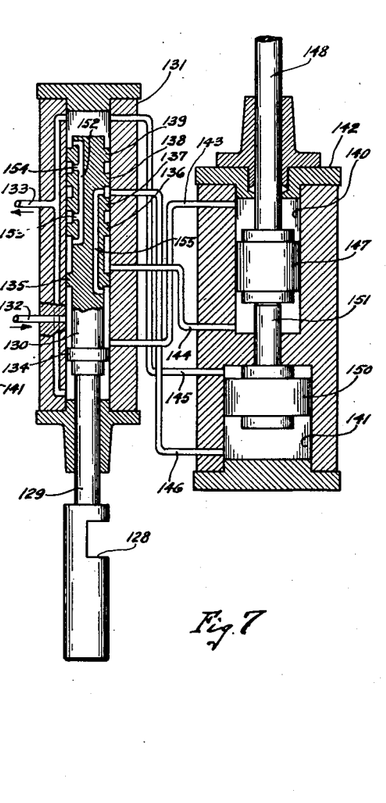
Fig. 7 is a detached diagrammatic sectional view of the power means for operating the main driving clutch and the control valve for said power means and shows the relative positions of said power means and control valve when the clutch is disengaged.

In order to hold the piston 147 in its intermediate position, as shown in Fig. 7, a second piston 150 of larger diameter than the piston 147 is slidably arranged in the cylinder 141 and is provided with an abutting portion 151 that extends into the cylinder 140 when the piston 150 is in its uppermost position in the cylinder 141, as viewed in Fig. 7. The abutting portion 151 when thus positioned abuts the piston 147 when the latter has been moved downwardly to intermediate position by pressure fluid acting on the upper side thereof, it being noted that due to the differential in the areas of the two pistons the pressure fluid acting on the underside of the piston 150 will hold said piston in its uppermost position and arrest the downward movement of the piston 147.

In order to obtain the positioning of the pistons 147 and 150, as indicated in Fig. 7 with a resultant disengagement of the clutch element 32, the valve body 130 of the control valve 131 must be positioned as shown in Fig. 7, at which time the control lever 123 will lie midway of the ends of the horizontal portion of the inverted T-slot 124 and at the lower end of the vertical portion of said slot, as indicated in Fig. 2. When the valve body 130 is thus positioned, the conduit 143 communicates with the valve chamber between the lands 134 and 135, as does also the inlet conduit 132, wherefore pressure fluid will flow through the valve chamber and the conduit 143 into the cylinder 140 at the upper side of the piston 147 to cause a downward movement of said piston. Pressure fluid will be exhausted from the cylinder 140 below the piston 147 through the conduit 144 which communicates with the valve chamber between the lands 135 and 136 of the valve body and said portion of the valve chamber is in turn exhausted through a passageway 152 formed in the valve body and extending to the upper end thereof above the land 139 as viewed in Fig. 7, it being noted that the valve chamber above the valve body is in communication with the exhaust conduit 133. The passage 152 is also in communication by lateral outlets 153 and 154 which communicate, respectively, with the spaces between the lands 136 and 137 and the lands 138 and 139 of the valve body for a purpose later to be described.

The conduit 146 communicates with the valve chamber in the space between the lands 137 and 138 of the valve body and such space is in communication by means of a passage 155 formed in the valve body with the space between the lands 134 and 135 that is in communication with the incoming pressure fluid, wherefore it will be seen that pressure fluid passes through the valve chamber passage 155 and conduit 146 to the cylinder 141 at the underside of the piston 150 and raises the latter to position the abutting portion 151 in the cylinder 140 to arrest the downward movement of the piston 147. The pressure fluid in the cylinder 141 above the piston 150 is exhausted through the conduit 145 which communicates with the upper end of the valve chamber that is in turn in communication with the exhaust outlet 133.

Figure 8:
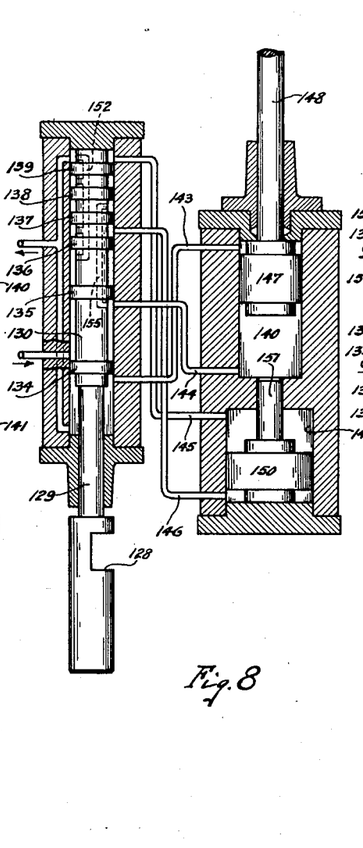
Fig. 8 is a view similar to Fig. 7 but illustrates the relative positions of the power means and the control valve therefor when the clutch is engaged for reverse drive.

When it is desired to engage the shiftable clutch element 32 with the element 31 for reverse drive of the spindle 27 the control lever 123 is moved to its extreme left hand position, as viewed in Fig. 2, in the horizontal portion of the inverted T-slot 124 and such movement positions the valve body 130 at its extreme limit of movement in one direction in the valve chamber, i. e., the position shown in Fig. 8. At this time the conduit 144 which communicates with the space between the lands 134 and 135 of the valve body is in communication with the inlet conduit 132 so that the incoming pressure fluid passes to the cylinder 140 to the underside of the piston 147, as viewed in Fig. 8, to cause said piston to move upwardly in the cylinder to its limit of movement which thus results in shifting the clutch element 32 from neutral position into engaged position with the clutch element 31. The pressure fluid in the cylinder 140 above the piston 147 is exhausted through the conduit 143 which communicates with the chamber of the valve 131 below the land 134, wherefore such pressure fluid can be exausted through the exhaust conduit 133.

When the valve body is thus positioned the pressure fluid in the cylinder 141 on the opposite sides of the piston 150 is exhausted as follows: The conduit 145 communicates with the end of the valve chamber beyond the land 139 and such portion of the valve chamber is in communication with the exhaust conduit 133. The conduit 146 communicates with the valve chamber between the lands 136 and 137 and this space, through the lateral outlet 153 and passage 152 in the valve body, is in communication with the valve chamber beyond the land 139 and, in turn, with the exhaust conduit 133.

It will be noted that although the passage 155 in the valve body 130 has its lower end in communication with the incoming pressure fluid, its upper end is dead-ended between the lands 137 and 138 of the valve body since the space between said lands is not in communication with any conduit.

Figure 9:
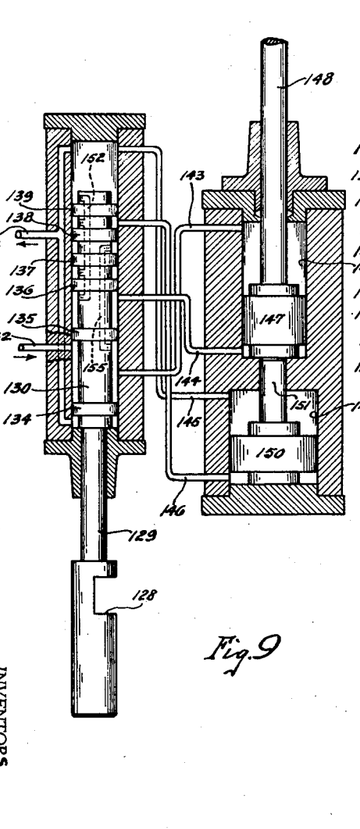
Fig. 9 is a view similar to Figs. 7 and 8 but shows the relative positions of the power means and the control valve therefor when the main driving clutch is engaged for forward drive.

When it is desired to move the shiftable clutch element 32 into engagement with the clutch element 30 for forward drive of the work spindle, the operator moves the control lever 123 to its extreme right hand position, as viewed in Fig. 2, in the horizontal position of the inverted T-slot 124, and this results in positioning the valve body 130 of the control valve 131 in the position shown in Fig. 9.

At this time the valve body 130 is in its lowermost position, as viewed in Fig. 9, and the conduit 143 communicates with the valve chamber between the lands 134 and 135 and this space is in communication with the inlet conduit 132, wherefore pressure fluid flows through the valve, conduit 143 and into the cylinder 140 at the upper side of the piston 147 to cause the latter to move to its lowermost position in the cylinder and to thus effect a shifting movement of the clutch element 32 into engagement with the clutch element 30. The lower end of the cylinder 140 beneath the piston 147 is exhausted through the conduit 144 which communicates with the valve chamber in the space between the lands 135 and 136, which space, in turn, is in communication through the passage 152 in the valve body with the space at the upper end of the valve chamber and with the exhaust conduit 133.

The cylinder 141 at opposite sides of the piston 150 is in communication with the exhaust outlet 133 through the conduits 145 and 146. The conduit 145 is in communication with the valve chamber above the valve body, wherefore pressure fluid exhausted from the upper side of the piston 150 can flow outwardly of the valve chamber through the exhaust outlet 133. The conduit 146 is in communication with the valve chamber in the space between the lands 138 and 139 of the valve body and this space, in turn, is in communication with the upper part of the valve chamber through the lateral opening 154 and the passage 152 in the valve body, wherefore the pressure fluid exhausted from the lower side of the piston 150 can pass outwardly through the exhaust conduit 133.

Again it will be noted that although the passage 155 in the valve body is in communication with the incoming pressure fluid between the lands 134 and 135 said passage 155 at its opposite end communicates with the space between the lands 137 and 138 and, therefore, is dead-ended.

It will also be understood that when both ends of the cylinder 141 are in communication with the exhaust outlet 133 the piston 150 can then be moved freely in the cylinder, wherefore if the portion 151 of the piston 150 is in the cylinder 140 it will be moved from the position shown in Fig. 7 to the position shown in Figs. 8 and 9, either by the action of the pressure fluid in the cylinder 140 or by the movement of the piston 147 and thereby the piston 150 can be shifted to its lowermost position as viewed in Figs. 8 and 9.

Figures 4, 5:
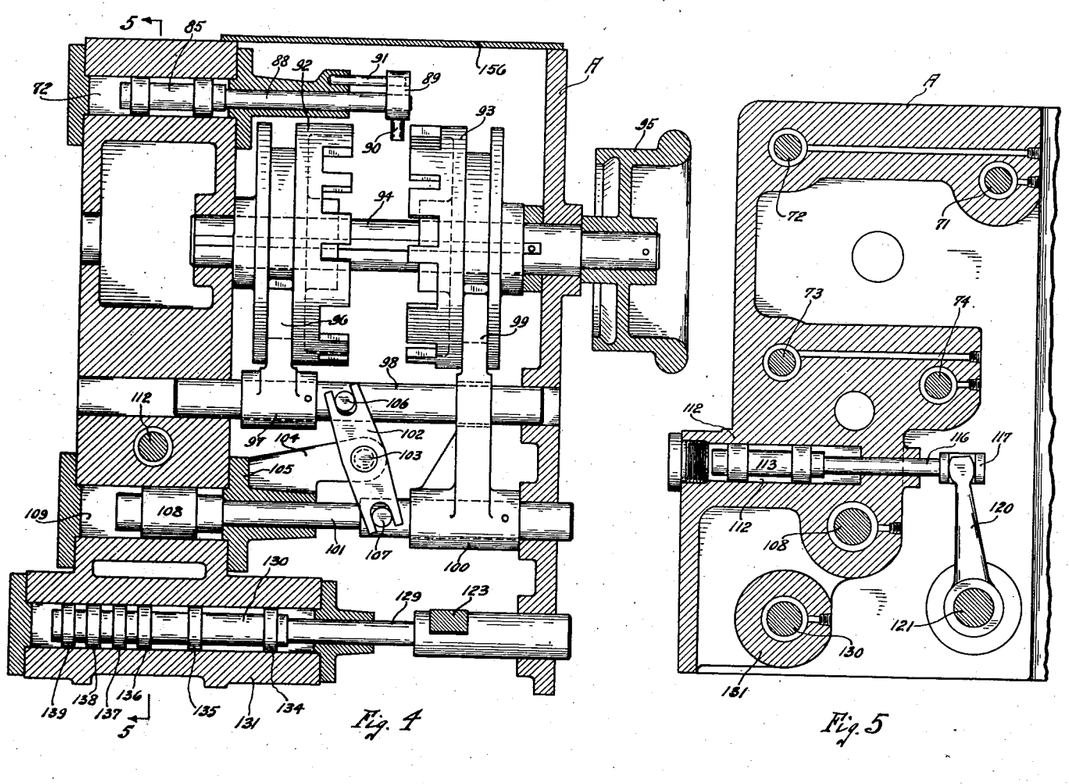
Fig. 4 is a vertical longitudinal sectional view taken substantially on irregular line 4—4 of Fig. 3, looking in the direction of the arrows.
Fig. 5 is a vertical transverse sectional view taken substantially on line 5—5 of Fig. 4 looking in the direction of the arrows.

A portion of the front and top of the housing of the unit A is provided with a removable L-shaped cover 156 which may be secured thereto in any convenient manner, wherefore when said cover is removed access can be had to the mechanism within the housing for purposes of inspection, assembly and the like. The rear side of the housing adjacent to the front side of the headstock, that is the right hand side as viewed in Figs. 3 and 5, is provided with flanges so that when the unit is secured to the headstock there will be sufficient room between the rear of the unit and the front of the headstock to accommodate the piping from the various control valves to the pressure fluid motors in the headstock.

The manner in which the unit in this embodiment of the invention is employed in the operation of the machine tool will now be explained so as to render the preceding description clearer and to coordinate the various portions thereof, as well as to more forcibly show the advantages derived from the use of the invention.

Assuming that the main driving clutch is in neutral and that a new work piece has been loaded upon the work spindle, the operator turns the indexing dial 95 to bring the graduation and indicia thereof that corresponds to the required spindle speed for the first operation into line with the pointer 127, and this movement of the indexing dial 95 rotates the shaft 94 and, in turn, indexes the spools 92 and 93 to the required or desired position, it being understood that at this time the spools are in their most outward or separated position and that suitable spring points are provided to hold the spools in their indexed position.

The operator then moves the control lever 123 vertically in the vertical portion of the inverted T-slot 124 out of the slot 128 in the stem 129 to its most upward position to rock the shaft 121 and through the lever arm 120 position the body 113 of the control valve 112 so that pressure fluid will be admitted to the cylinder 109 through the conduit 110 to cause the piston 108 to move upwardly, as viewed in Fig. 6, to effect equalized endwise movement of the spools toward each other and a resultant shifting of one or more of the pins 90 and of the control valves 71, 72, 73 and 74 associated therewith. The shifting of the control valves just named will cause one or more of the pistons 59, 61, 66 and 70 of the pressure fluid motors to be shifted to effect the desired shifting movement of the shiftable gear cones in the change speed transmission to obtain the desired spindle speed for the first operative step of the work cycle.

The shiftable gear cones having now been shifted to obtain the desired spindle speed, the operator moves the control lever 123 vertically downwardly in the vertical slot of the inverted T-slot 124 to again position it in the slot 128 of the valve stem 129 and then horizontally to the right or to the left, as the case may be, to cause an engagement of the main driving clutch for forward or reverse drives, respectively, it being understood that such downward movement of the control lever shifts the valve body 113 of the valve 112 and causes the spools 92 and 93 to move outwardly away from each other to a position where the projections on their adjacent faces are clear of the pins 90, so that the spools can be again indexed (see Fig. 4).

It will be understood that when the control lever 123 is moved horizontally toward either the right or the left in the horizontal portion of the inverted T-slot 124, such movement causes a shifting of the valve body 130 of the valve 131 to effect the proper movement of the piston 147 of the pressure fluid motor 142 to obtain an engagement of the shiftable clutch element 32 with the element 30 for forward drive or with the element 31 for reverse drive as the case may be. The horizontal movement of the control lever 123 does not affect the valve 112 while the vertical movement of the lever causes no change in position of the valve 131.

The machine is now operating in the first operative step of the work cycle and the operator may index the spools during said first step to preselect the spindle speed for the next step, or he may wait until the completion of the first operative step, then disengage the main driving clutch and select the spindle speeds for the second operative step by rotating the dial 95 and indexing the spools.

It will be assumed that the operator preselects the spindle speed for the second operative step during the operation of the machine in the first operative step and, therefore, he will turn the indexing dial 95 to bring the indicia corresponding to the spindle speed for the second operative step into line with the pointer 127 to cause the correct indexing of the spools 92 and 93. As soon as the first operative step has been completed the operator moves the control lever horizontally in the inverted T-slot to neutral position to effect a disengagement of the main driving clutch and he then moves said control lever vertically upwardly to rock the shaft 121 and set the control valve 112 to effect an equalized inward movement of the spools 92 and 93 toward each other to bring the projections on their adjacent faces into contact with one or more of the pins 90 to effect a shifting of the control valves 71, 72, 73 and 74 and, in turn, an operation of one or more of the pressure fluid motors that are associated with the shiftable gear cones, so that the latter will be shifted to obtain the desired and preselected spindle speed. When this has taken place the operator moves the control lever vertically downwardly to shift the valve 112 to cause the spools to move outwardly to their most outward position, and then he moves the control lever horizontally to the right or left to shift the control valve 131 to effect an engagement of the main driving clutch for forward or reverse drive to impart the new spindle speed to the spindle for the second operative step of the cycle.

The procedure hereinbefore described is followed by the operator in preselecting and obtaining the different spindle speeds for the remaining operative steps in the complete work cycle.

If desired the dial 95 can be provided with adjustable devices, such as clips, bearing indicia corresponding to the different operative steps of the work cycle and these devices can be mounted on the dial in corelation to the different spindle speeds to be obtained in each of the operative steps, so that the operator merely turns the dial to bring the device bearing the numeral corresponding to a particular operative step into line with the pointer to select or preselect the required spindle speed for the said step.

Figure 11:
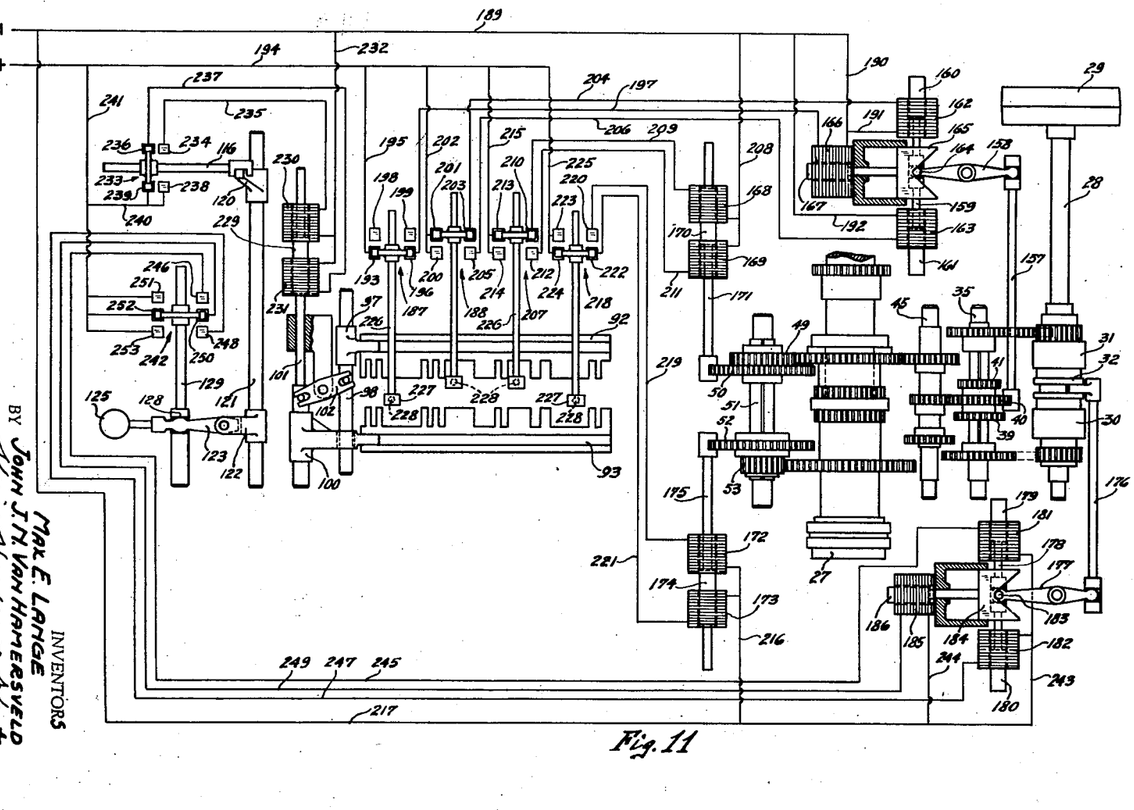
Fig. 11 is a developed plan and sectional diagrammatic view of another embodiment of the invention and shows the change speed transmission in the headstock, electric motive power means for shifting the shiftable elements of said transmission, and the main driving clutch, the control switch for said power means and the selecting or preselecting mechanism for controlling certain of said control switches, as well as the control mechanism for the control switch associated with the power means for shifting the main driving clutch.

In Fig. 11 there is illustrated another embodiment of the invention wherein electromotive power means and electrical control switches therefor are employed in place of the pressure fluid motors and control valves previously described.

Inasmuch as the transmission, main driving clutch in the headstock and the indexible and endwise movable spools and single control lever of the control unit are the same as in the previously described embodiment, the same reference characters will be used in describing Fig. 11 in all instances where possible as were used in describing the first embodiment of the invention.

The three-step gear cone on the shaft 35 is shifted to its three different operative positions by electromotive power means through a shifting rod 157 similar to the rod 57 which, in turn, is operatively associated with a pivoted lever 158 that is operatively connected with the power means now to be described.

An endwise movable bar 159 is provided at its opposite ends with core portions 160 and 161 of solenoids 162 and 163, respectively. The bar 159 intermediate its ends has an enlarged portion provided with a slot in which is located the rounded end of the pivoted lever 158. The end of the lever 158 that is located in said slot is provided with an upwardly projecting pin 164, as viewed in Fig. 11, and said pin extends into a V-recess formed in a slide 165 that overlies the core bar 159 and the lever 158. The slide 165 is suitably supported and guided by a housing which carries a solenoid 166 of greater capacity than the solenoids 162 and 163, and the core 167 of the solenoid 166 is provided with a reduced extension that is connected to the slide 165.

It will be understood that the purpose of the solenoids 162 and 163 is to effect swinging movement of the lever 158 about its pivot to either of its extreme positions, while the purpose of the solencid 166 and slide 165 is to position the lever in its intermediate position to thus impart to the three-step gear cones three different operative positions.

The rear two-step gear cone on the shaft 51 is shifted to either of its two operative positions by means of the solenoids 168 and 169 having a common core 170 that is connected to a shifting rod 171 operatively connected with the two-step gear cone similar to the rod 64 previously described.

The front two-step gear cone on the shaft 51 is shifted to either of its two operative positions by means of the solenoids 172 and 173 having a common core 174 that is connected to a shifting rod 175 operatively associated with the front two-step gear cone, similar to the rod 68.

The shiftable clutch element 32 of the main driving clutch is moved to either of its two engaged positions or to its neutral position by means of the shifting rod 176 operatively connected to the element in a manner similar to the rod 148. The lower end of the rod 176, as viewed in Fig. 11, is provided with an enlarged portion having a slot in which extends the rounded end of a pivoted lever 177, the opposite end of which is located in a slot formed in an enlarged portion of a core bar 178 that has core portions 179 and 180 on its opposite ends which operate in the solenoids 181 and 182 respectively. The end of the pivoted lever 177 that is in the slot in the enlarged portion of the core bar 178 is provided with an upstanding pin 183, as viewed in Fig. 11, that extends into a V formed in a slide 184, while said slide overlies the lever and the core bar. This slide is supported and guided in a suitable housing which carries a solenoid 185, having a core 186 operatively connected to the slide 184.

It will be seen that the energization of the solenoids 181 or 182 effects a movement of the shiftable clutch element 32 to either of its two engaged positions, while energization of the solenoid 185 effects a positioning of the lever 177 intermediate its two extreme positions of movement to, in turn, position the shiftable clutch element in neutral or disengaged position.

The energization of the solenoids 166, 162 and 163 is controlled by sliding contact switches 187 and 188. As shown in Fig. 11, the solenoids 166, 162 and 163 are connected to the negative side of an electrical circuit indicated at 189 by electrical conduits 190, 191 and 192. The switch 187 has its contact 193 connected to the positive side of the circuit indicated at 194 by a conduit 195. The contact 196 of the switch 187 is connected to the solenoid 166 by a conduit 197 and therefore to the positive side of the circuit through the switch when said switch is in engagement with the contacts 193 and 196. The dummy contacts 198 and 199 of the switch 187 are not connected into the circuit, wherefore when the switch is in engagement with said dummy contacts the solenoid 166 is deenergized.

The contacts 200 and 201 of the switch 188 are each connected to the positive side 194 of the circuit by a conduit 202. The contact 203 of the switch 188 is connected to the solenoid 162 by the conduit 204, wherefore when the switch is in engagement with the contacts 201 and 203 the solenoid 162 is energized. The contact 205 of the switch 188 is connected to the solenoid 163 by a conduit 206, wherefore when the switch is in engagement with contacts 200 and 205 the solenoid 163 is energized.

It will be noted that one or the other of the solenoids 162 and 163 will be energized when the switch 188 is moved into one or the other of its two operative positions. It will further be noted that since the solenoid 166 is of larger capacity than the solenoids 162 and 163, said solenoid 166 when energized will move the slide 165 so as to position the lever as shown in Fig. 11, and due to its larger capacity will overcome the action of either of the solenoids 162 and 163. It will also be observed that when the solenoid 166 is deenergized the slide 165 will be free to move either by gravity or by the action of the pin on the inclined sides of the V-recess when the core bar is moved by the solenoids 162 or 163.

The solenoids 168 and 169 are controlled by a sliding contact switch 207. The solenoids 168 and 169 are connected to the negative side of the electrical circuit through a conduit 208 and to the positive side 194 through the switch 207 by means of a conduit 209 extending from the solenoid 168 to the contact 210 of the switch 207, and by a conduit 211 extending from the solenoid 169 to the contact 212 of said switch. The contacts 213 and 214 of the switch 207 are connected to the positive side 194 of the circuit by the conduit 215.

It will be seen that when the switch 207 is in engagement with the contacts 210 and 213 the solenoid 168 is energized, and when the switch is in engagement with the contacts 212 and 214 the solenoid 169 is energized and consequently one or the other of said solenoids will be energized when said switch is in one or the other of its operative positions.

The solenoids 172 and 173 are connected to the negative side of the circuit by the conduits 216 and 217, which latter conduit is connected to the conduit 189 of the negative side of the circuit. The solenoids 172 and 173 are connected to the positive side of the circuit through the medium of a sliding contact switch 218, it being noted that solenoid 172 is connected by conduit 219 to contact 220 of the switch 218 and solenoid 173 is connected by conduit 221 to contact 222 of the switch 218. Contacts 223 and 224 of the switch 218 are connected with the conduit 194 on the positive side of the circuit by a conduit 225.

It will be seen that when the switch 218 is in engagement with the contacts 220 and 223 the solenoid 172 is energized and when said switch is in engagement with the contacts 222 and 224 the solenoid 173 is energized and therefore one or the other of said solenoids is energized when said switch is in one or the other of its two operative positions.

The switches 187, 188, 207 and 218 are provided with actuating rods 226 corresponding to the valve stems 88 and said rods 226 at their outer ends are provided with heads 227 corresponding to the heads 89 and provided with radially extending pins 228 corresponding to the pins 90 and located between the projections on the adjacent faces of the spools 92 and 93 in the same manner as described in connection with the pressure fluid embodiment of the invention.

Inasmuch as the actuation or shifting of the actuating rods 226 by the spools is the same as the actuation or shifting of the valve stems 88 in the previously described form, it is believed unnecessary to explain the same in detail, it being understood that when the rods are moved the switches are slid from engagement with one pair of contacts into engagement with the other pair of contacts.

The spools 92 and 93 in the embodiment now being described are shifted endwise toward and away from each other with an equalized movement by mechanism that is substantially identical with that previously described and clearly shown in Fig. 4 and therefore the corresponding parts of said mechanism will be given the reference characters previously used. It will be noted, however, that the rod 101 in place of being connected to a piston of a pressure fluid motor is provided with a core 229 that operates in solenoids 230 and 231 which are connected to the negative side 189 of the electrical circuit by a conduit 232 and to the positive side 194 by sliding contact switch 233. The solenoid 230 is connected to the contact 234 of said switch by a conduit 235, while the solenoid 231 is connected to the contact 236 of the switch by a conduit 237. The contacts 238 and 239 of the switch 233 are connected to the positive side 194 of the circuit by conduits 240 and 241.

It will be seen that one or the other of the solenoids 230 and 231 will be energized when the switch 233 is in one or the other of its two operative contact engaging positions. The switch 233 is operated by the identical mechanism which operates the control valve 112 in the previously described form, and, therefore, the description of such mechanism need not be set forth in connection with the present embodiment and the parts thereof can be identified by the same reference characters, it being noted that the actuating rod for the switch 233 corresponds to the valve stem 116 and is so numbered in Fig. 11.

The solenoids 180, 181 and 185 of the electromotive power means for shifting the main driving clutch are controlled by a sliding contact switch 242, the solenoids 181, 182 and 185 being connected to the negative side 189 of the circuit by conduits 243, 244 and 217. The solenoid 181 is connected to the positive side 194 of the circuit through the switch 242 by a conduit 245 in turn connected to contact 246 of the switch. The solenoid 182 is connected to the positive side 194 of the circuit and through the switch 242 by a conduit 247 which is connected to contact 248 of the switch. The solenoid 185 is connected to the positive side of the circuit through the switch 242 by a conduit 249 that is, in turn, connected to contact 250 of the switch. The contacts 251, 252 and 253 of the switch 242 are connected to the positive side 194 by conduit 241.

The switch 242 is actuated by the main control lever 123 in the same way as is the valve 131 previously described, it being noted that the actuating rod for the switch corresponds to the valve stem 129 and is so identified in Fig. 11.

Inasmuch as the mode of operation of the embodiment of the invention shown in Fig. 11 and just described is identical with the embodiment previously described, it will not be necessary to set forth herein said mode of operation.

As stated previously herein, the unit embodying the selecting or preselecting control mechanism could, if desired, be located in a position independent of and remote to the machine tool with which it is employed and under such circumstances the control valves for the pressure fluid motors or the control switches for the solenoids would simply be connected to the motors or solenoids by suitable conduits.

Although a preferred embodiment of the invention has been illustrated and described herein, it will be understood that the invention is susceptible of various modifications and adaptations within the scope of the appended claims.

Having thus described our invention, we claim:
1. In a machine tool having a movable part, a change speed transmission for moving said part at different rates, and power means operatively associated with the shiftable members of said transmission for shifting the same, a control mechanism comprising control elements for said power means, and means operatively associated with said elements indexible to various positions corresponding to the different rates of movement of said part and then actuatable to position one or more of said control elements to effect operation of said power means to obtain the desired rate of movement for said part.

2. In a machine tool having a movable part, a change speed transmission for moving said part at different rates and including movable speed changing members, power means for moving said members to effect speed changes in said transmission, control elements for said power means, and means operatively associated with said elements and first movable to various predetermined positions corelated to the various control positions of said elements and then movable to effect a positioning of one or more of said elements in the desired controlling positions to initiate actuation of said power means to move one or more of said movable members in said transmission to obtain the desired rate of movement for the movable part.

3. In a machine tool having a movable part, change speed gearing for moving said part at different rates and including shiftable members, separate power means for shifting said members, control elements for each of said power means, and a device for selecting or preselecting the rate of movement of said part and operatively associated with said control elements and including means movable to various positions corresponding to the different rates of said part and to the different operative positions of said elements and then movable to move one or more of said elements to said predetermined operative positions to effect predetermined operation of one or more of said power means to shift one or more of said shiftable members to obtain the selected or preselected rate of movement for said part.

4. In a machine tool having a movable part, change speed transmission for moving said part at different rates and including movable speed changing members, pressure fluid motors for moving said members, control valves for said motors and mechanism operatively associated with said control valves and indexible to various positions corelated to the different rates of movement of said part and then movable to actuate one or more of said valves to effect the operation of one or more of said motors to move said movable members to obtain a predetermined rate of movement for said part.

5. In a machine tool having a movable part, a change speed transmission for moving said part at different rates and including movable change speed members, hydraulic means for moving said members, valves controlling said hydraulic means, and mechanism for selecting or preselecting the different rates of movement of said part and including members indexible to various positions corelated to various settings of said valves and then movable to shift said valves in predetermined positions to operate said pressure fluid means to move said members to obtain the selected or preselected rate of movement of said part.

6. In a machine tool having a movable part, a change speed transmission for moving said part at different rates and including movable speed changing members, pressure fluid means for moving said members to obtain different rates of movement for said part, and mechanism for selecting or preselecting the rates of movement of said part and including valves controlling said pressure fluid means, and means in turn controlling said valves and indexible to various positions corelated to the different valve positions and then movable to actuate said valves to said positions.

7. In a machine tool having a movable part, a change speed transmission for moving said part and including movable members for changing the rate of movement of said part, pressure fluid means for moving said members, valve means for controlling said pressure fluid means, and means operatively associated with said valves for selecting or preselecting different valve positions, and means for actuating said selecting or preselecting means to shift said valves to the selected or preselected positions.

8. In a machine tool, a movable part, a power source, a change speed transmission including movable speed changing members for obtaining different rates of movement of said part, a shiftable driving connection between said power source and said transmission, pressure fluid means for moving said movable members and for shifting said driving connection, valves controlling said pressure fluid means, means for selecting or preselecting the positioning of certain of the valves to control the pressure fluid means which move said movable members, means for controlling said selecting or preselecting means to actuate the selected or preselected valves, and a single control member for the last named means that is operatively associated with the valve controlling the pressure fluid means that shifts the driving connection.

9. In a machine tool, a movable part, a change speed transmission operatively associated with said part and including movable speed changing members, a power source, a driving connection between said power source and said transmission, power operated means for moving said members and for engaging or disengaging said driving connection, devices for controlling the operation of said power operated means, means for selecting or preselecting the settings of certain of said devices to cause certain of said power operated means to be operated to move said movable members, means controlling said selecting or preselecting means to actuate said certain devices, and a single control means for said last named means and having an operative connection with the device that controls the operation of the power operated means that effects the engagement and disengagement of the main driving connection.

10. In combination with a machine tool of the type having a movable part, a change speed transmission for moving said part at different rates and including movable rate changing members, and power operated means for moving said members; a control unit for selecting or preselecting the rates of movement of said part and including devices for controlling the operation of said power operated means, and means for selecting or preselecting the positions of said devices, and means for actuating said last named means to move said devices to said selected or preselected positions.

11. In combination with a machine tool of the type having a movable part, a change speed transmission to said part and including a movable rate changing member, and power operated means operatively connected to said member for moving the same; a control unit for selecting or preselecting the rate of movement of said part and comprising a device for controlling the operation of said power operated means, and mechanism having an indexing movement to select or preselect predetermined settings of said device in relation to rates of movement of said part and an actuating movement to actuate said device to the selected or preselected settings.

12. In combination with a machine tool of the type having a movable part, a change speed transmission for said part including movable rate changing members to vary the rate of said part, and separate power operated means operatively connected with said members for moving the same; a control unit for selecting or preselecting the rate of movement of said part and comprising control devices for said separate power operated means and operatively associated therewith, and mechanism having an indexible movement to select or preselect different settings of said devices in relation to rates of movement of said part, and an actuating movement to actuate said devices to obtain said selected or preselected settings.

13. In combination with a machine tool of the type having a movable part, a change speed transmission for moving said part at different rates and including movable rate changing members, a power source, a driving connection between said power source and said transmission, separate power operated means for moving said members and for controlling said driving connection; and a control unit for selecting or preselecting the rates of movement for said part and comprising control devices for said power operated means that move said members, indexible mechanism for selecting or preselecting the setting of said devices in relation to various rates of movement of said part, means for actuating said mechanism to move said devices to the selected or preselected settings, and a single control means for said last named means and said power operated means that controls said driving connection and having operative connections with said last named means and said power operated means.

14. In combination with a machine tool of the type having a movable part, a change speed transmission therefor including movable rate changing members and separate power operated means for moving said members; of a control unit for selecting or preselecting the rates of movement of said part and comprising devices for controlling said power operated means, and members movable in one direction to index the same to select or preselect predetermined settings of said devices in relation to rates of movement of said part and movable in another direction to actuate said devices to obtain the selected or preselected settings thereof.

15. A control unit for a machine tool of the type having a change speed transmission wherein the movable speed changing members are power operated and comprising control devices adapted to be operatively connected with the power operated means for moving the movable members of the transmission, and mechanism for selecting or preselecting the settings to be imparted to said devices and for actuating said devices to obtain the selected or preselected settings thereof and including members operatively associated with said devices and movable in one direction to select or preselect the settings thereof and in another direction to actuate said devices to obtain said settings.

16. A control unit for a change speed transmission of a machine tool in which power operated means shifts the movable rate changing members thereof, said unit comprising a pair of members mounted for rotating indexing movement and for linear actuating movement and having on their adjacent portions actuating projections, control devices adapted to be operatively connected with the power operated means for shifting the movable members of the transmission and having portions located between the adjacent portions of said members of the control unit, means for rotating said control unit members to select or preselect various settings of said control devices, and means for moving said control unit members linearly to bring the projections of the adjacent portions thereof into engagement with said portions of said devices to actuate said devices to the selected or preselected settings.

17. In a machine tool having a change speed transmission including shiftable speed changing members, separate power means for shifting said members, a power source for operating said means, devices for directly controlling the connection of said power source to said means and mechanism first movable to select or preselect the setting of said devices and then movable to actuate said devices to the selected or preselected settings.

18. In a machine tool having a change speed transmission including a shiftable speed changing member, power means for shifting said member, a power source for operating said means, a device for directly controlling the connection of said power source to said means, and mechanism first movable to select or preselect the setting of said device and then movable to actuate said device to the selected or preselected setting.

19. In a machine tool having a change speed transmission including shiftable speed changing members, pressure fluid power means for shifting said members, a pressure fluid source for operating said means, a device for directly controlling the connection of said source to said means, and mechanism first movable to select or preselect the setting of said device and then movable to actuate said device to the selected or preselected setting.

20. In a machine tool having a change speed transmission including a shiftable speed changing member, electromotive means for shifting said member, a power source for operating said means, a device for directly controlling the connection of said power source to said means, and mechanism first movable to select or preselect the positioning of said device and then movable to move said device to the selected or preselected position.

21. In a machine tool having a change speed transmission including a shiftable speed changing member and a shiftable driving connection, separate power means for shifting said member and said driving connection, a power source for operating said means, devices for directly controlling the connection of said power source to said means, mechanism first movable to select or preselect the setting of the devices that control the connection of the power source to the power means that shifts said member, and means for moving said mechanism to actuate said last named devices to the selected or preselected positions and including a control lever, and means constituting an operative connection between said lever and the device that controls the connection of the power source to the power means that shifts the driving connection whereby said lever controls said connection.

22. In a machine tool having a change speed transmission including a shiftable speed changing member and a shiftable driving connection, a power means for shifting said member, a power means for shifting said driving connection, a device for controlling said first named power means, mechanism indexible to select or preselect the setting of said device, means for moving said mechanism to actuate said device to the selected or preselected setting and including power means therefor, a device for controlling said last named power means, a device for controlling said second named power means, and a single control lever operatively associated with both of said last named devices.

23. In a machine tool having a change speed transmission including a shiftable speed changing member and a shiftable driving connection, a pressure fluid power means for shifting said member, a pressure fluid power means for shifting said driving connection, a device for controlling said first named pressure fluid power means, mechanism indexible to select or preselect the setting of said device, means for moving said mechanism to actuate said device to the selected or preselected setting and including pressure fluid power means therefor, a device for controlling said last named pressure fluid power means, a device for controlling said second named pressure fluid power means, and a single control lever operatively associated with both of said last named devices.

24. In a machine tool having a change speed transmission including a shiftable speed changing member and a shiftable driving connection, electromotive means for shifting said member, electromotive means for shifting said driving connection, a device for controlling said first named electromotive means, mechanism indexible to select or preselect the setting of said device, means for moving said mechanism to actuate said device to the selected or preselected setting and including electromotive means therefor, a device for controlling said last named electromotive means, a device for controlling said second named electromotive means, and a single control lever operatively associated with both of said last named devices.

25. In a machine tool having a change speed transmission including shiftable speed changing members and a shiftable driving connection, separate power means for shifting said members, power means for shifting said driving connection, devices for controlling said separate power means, mechanism having indexible movement to select or preselect the settings of said devices and an actuating movement to move said devices to the selected or preselected settings, means for imparting said actuating movement to said mechanism and including power means, a device for controlling said last named power means, a device for controlling said second named power means, and a single control member having an operative connection with both of said last named devices to actuate one or the other of said devices.

26. In a machine tool having a change speed transmission including shiftable speed changing members and a shiftable driving connection, separate pressure fluid power means for shifting said members, pressure fluid power means for shifting said driving connection, devices for controlling said separate pressure fluid power means, mechanism having indexible movement to select or preselect the settings of said devices and an actuating movement to move said devices to the selected or preselected settings, means for imparting said actuating movement to said mechanism and including pressure fluid power means, a device for controlling said last named pressure fluid power means, a device for controlling said second named pressure fluid power means, and a single control member having an operative connection with both of said last named devices to actuate one or the other of said devices.

27. In a machine tool having a change speed transmission including a shiftable speed changing member and a shiftable driving connection, separate electromotive means for shifting said member, electromotive means for shifting said driving connection, devices for controlling said separate electromotive means, mechanism having indexible movement to select or preselect the settings of said devices and an actuating movement to move said devices to the selected or preselected settings, means for imparting said actuating movement to said mechanism and including electromotive means, a device for controlling said last named electromotive means, a device for controlling said second named electromotive means, and a single control member having an operative connection with both of said last named devices.

28. In a machine tool having a change speed transmission including shiftable speed changing members and a shiftable driving connection, hydraulic motors operatively connected with said members, a hydraulic motor operatively connected with said shiftable driving connection, a plurality of valves controlling said first named hydraulic motors, selecting or preselecting members operatively associated with said valves and movable in one direction to index the same to select or preselect different operative positions of said valves and movable in another direction to shift said valves to the selected or preselected positions, means for moving said selecting or preselecting members in said last named direction and including a hydraulic motor, a valve for controlling said last named hydraulic motor, a valve for controlling said second named hydraulic motor, a control member, and means forming operative connections between said control member and both of said last named valves.

29. In a machine tool having a change speed transmission including shiftable speed changing members and a shiftable driving connection, solenoids operatively connected with said members, a solenoid operatively connected with said shiftable driving connection, a plurality of switches controlling said first named solenoids, selecting or preselecting members operatively associated with said switches and movable in one direction to index the same to select or preselect different operative positions of said switches and movable in another direction to shift said switches to the selected or preselected positions, means for moving said selecting or preselecting members in said last named direction and including a solenoid, a switch for controlling said last named solenoid, a switch for controlling said second named solenoid, a control member, and means forming operative connections between control member and both of said last named switches.

30. In a machine tool having a shiftable member and pressure fluid power means for shifting said member including a plurality of piston chambers, a control valve for said pressure fluid power means having multiple connections with each of said chambers, said valve being provided with a valve body having a plurality of longitudinally spaced lands forming a plurality of spaces therebetween, one of said spaces being in communication directly with incoming pressure fluid and another of said spaces being in communication with incoming pressure fluid by a passageway formed in the valve body and connecting said space with said first mentioned space, said valve body being provided with a second passageway in communication with the remaining spaces for conducting exhaust fluid therethrough.

31. In a machine tool having a shiftable member, pressure fluid power means for shifting said member and including a pair of piston chambers, a control valve for said pressure fluid power means and having multiple connections with each of said chambers, a valve body in said valve provided with a plurality of longitudinally spaced lands forming fluid spaces therebetween, two of said spaces being connected by a passage formed in said valve body and subject to live fluid, the remainder of said spaces being connected by a second passage formed in said valve body and subject to exhaust fluid.

32. In a machine tool having a change speed transmission including a shiftable member movable to three different positions, power means for shifting said member and including a pair of opposed solenoids having a positive mechanical connection therewith for shifting said member to either of its extreme positions, and a third solenoid operatively connected with said member by means including a cam and effective to shift the same to its intermediate position.

33. In a machine tool having a change speed transmission including a shiftable member movable to any one of three different positions, power means for shifting said member and including a pair of opposed solenoids having a positive operative connection with said member to shift the same to either of its extreme positions, a third solenoid of greater capacity than either of said first named solenoids and operatively associated with said member by means including a cam to shift said member to its intermediate position and a pair of switches controlling all of said solenoids one of said switches having two closed or operative positions to effect energization of one or the other of said first mentioned solenoids and the other of said switches having a closed or operative position and an open or inoperative position to control the energization or deenergization of said third named solenoid.

MAX E. LANGE.
JOHN J. N. VAN HAMERSVELD.